(12) United States Patent
Shelton (10) Patent No.: US 6,224,207 B1
(45) Date of Patent: May 1, 2001

(54) CLIP-ON SUNGLASS ASSEMBLY

(75) Inventor: Robert Shelton, Princeton, MA (US)

(73) Assignee: Yorktowne Optical Company, Inc., Emigsville, PA (US)

( * ) Notice: Subject to any disclaimer, the term of this patent is extended or adjusted under 35 U.S.C. 154(b) by 0 days.

(21) Appl. No.: 09/527,690

(22) Filed: Mar. 17, 2000

(51) Int. Cl.⁷ ................................................. G02C 9/00
(52) U.S. Cl. .................................................. 351/47; 351/48
(58) Field of Search ................................. 351/47, 48, 57, 351/58

(56) References Cited

U.S. PATENT DOCUMENTS

| | | | |
|---|---|---|---|
| 3,147,488 | 9/1964 | Maxson | 351/47 |
| 3,531,188 | 9/1970 | LeBlanc et al. | 351/47 |
| 3,575,497 | 4/1971 | LeBlanc | 351/47 |
| 3,876,295 | 4/1975 | Loughner | 351/47 |
| 4,163,607 | 8/1979 | Nannini | 351/47 |
| 5,100,224 | 3/1992 | Terrasi | 351/47 |
| 5,164,749 | 11/1992 | Shelton | 351/47 |
| 5,696,571 | 12/1997 | Spencer et al. | 351/47 |
| 5,793,463 * | 8/1998 | Hirschman et al. | 351/47 |

* cited by examiner

Primary Examiner—Huy Mai
(74) Attorney, Agent, or Firm—Nixon Peabody LLP; Donald R. Studebaker (57) ABSTRACT

A clip-on sunglass assembly for positioning clip-on lenses with respect to spectacles worn by the consumer including a central body, a first pair of clamping arms extending from the central body with the first pair of clamping arms including a central region and arm extensions, a second pair of clamping arms extending from the central body, the second pair of clamping arms also including a central region and arm extensions in an opposed position with respect to the first pair of clamping arms, a support rail for supporting the lenses mounted on the central body and a spring for biasing the central regions of the first and second pair of clamping arms away from one another and the arm extensions of the first and second clamping arms toward one another for securing the clip-on sun glass assembly with respect to the spectacles.

26 Claims, 7 Drawing Sheets

CLIP-ON SUNGLASS ASSEMBLY

TECHNICAL FIELD OF THE INVENTION

The present invention is directed to a clip-on sunglass assembly and particularly to a flip-up sunglass clip. More particularly, the present invention is directed to a flip-up sunglass clip wherein the application of the flip-up sunglass clip to the spectacles is readily controlled by the consumer and easily mountable to a variety of spectacles.

BACKGROUND OF THE INVENTION

Most known types of clip-on sunglasses include a pivotable or "flip-up" feature however, those available often times require the user to remove his ordinary spectacles in order to attach the auxiliary or clip-on sunglasses thereto. This is usually accomplished by slipping the top portion of the spectacle frame between one or more pairs of fixed resilient clamping prongs or fingers which form part of the assembly and comprises the flip-up sunglasses. Having to remove ones spectacles to attach the auxiliary sunglasses can be of great inconvenience especially when driving an automobile.

U.S. Pat. No. 3,575,497 issued to LaBlanc illustrates one known type of "flip-up" sunglasses. This configuration for sunglass lenses is adapted to removably clip onto the spectacles in a manner which permits the lenses to be moved between one of two stable positions, an operative position where the sunglasses are positioned within a line of sight and an inoperative position wherein those lenses are in a remote position from the line of sight. In order to position the "flip-up" sunglasses on a users spectacles, the clamping arms are pivoted with respect to one another so as to permit the grasping of the spectacles therebetween. The clamping members are fixedly positioned with respect to one another and an upper region of the clamping mechanism and include a torsion spring which exerts a rotational force against an upper limit of the clamping members in order to clamp the spectacles of the user therebetween. This continued torsional force acting on the clamping mechanisms can often become warn and consequently not provide the requisite torsional force in order to maintain the sunglasses in a fixed position with respect to the spectacles. Furthermore, continued manipulation of the torsional spring and particularly over extension of such a torsional spring can prematurely lessen the life of the flip-up sunglass clip.

In an effort to overcome the aforementioned shortcomings, a clip for mounting sunglass lenses to spectacles is set forth in U.S. Pat. No. 5,164,749 issued to Shelton. Therein, the torsional spring is replaced with a "c" shaped spring which retains the members of the clamping mechanism together and provides the requisite torsional force to the clamping members in order to clamp the sunglass structure to the spectacles of the user. However, again, continued manipulation of the sunglass clip over time will eventually where the "c" shaped spring thus resulting in an inadequate force being applied to the spectacles in order to maintain their position with respect thereto. Additionally, the "c" shaped spring may be easily damaged due to misuse by children should the biasing mechanism be overextended.

Clearly, there is a need in the art for a clip-on sunglass mechanism which may be easily and reliably manipulated by the consumer yet one which resists over flexing and destruction due to misuse.

SUMMARY OF THE INVENTION

It is a primary object of the present invention to overcome the aforementioned shortcomings associated with the prior art devices.

A further object of the present invention is to provide a clip-on sunglass attachment which is readily and reliably manipulated by the consumer using a single hand.

A further object of the present invention is to provide a clip-on sunglass attachment which requires no pre-preparation by the consumer prior to applying the clip-on sunglasses to existing spectacles.

A still further object of the present invention is to provide a clip-on sunglass attachment wherein the clip-on sunglasses may be readily positioned on a users spectacles by merely compressing and releasing the attachment.

A still further object of the present invention is to provide a clip-on sunglass attachment wherein the mechanism for attaching the sunglass attachment to the spectacles clamps the spectacles utilizing direct pressure rather than pivotal clamping-type pressure.

Another object of the present invention is to provide a sunglass attachment which can withstand some misuse by the consumer. Particularly, one which is not readily damaged due to over extension of the clamping mechanism.

The foregoing advantages as well as others are achieved by providing a clip-on sunglass assembly for positioning clip-on lenses with respect to spectacles worn by the consumer including a central body, a first pair of clamping arms extending from the central body with the first pair of clamping arms including a central region and arm extensions, a second pair of clamping arms extending from the central body, the second pair of clamping arms also including a central region and arm extensions in an opposed position with respect to the first pair of clamping arms, a support rail for supporting the lenses mounted on the central body and a spring for biasing the central regions of the first and second pair of clamping arms in a first direction and the arm extensions of the first and second clamping arms in a second direction for securing the clip-on sun glass assembly with respect to the spectacles.

In an embodiment of the clip-on sunglass assembly in accordance with the present invention, the support rail is received in a recess formed in the central body such that the spring contacts the support rail for maintaining the lenses in one of an operative and inoperative position with respect to the spectacles. Further, the clip-on sunglass assembly includes a central bore formed in the central body intersecting the recess for receiving the spring. In order to accomplish this, the second pair of clamping arms are movable with respect to the central body. Particularly, the central region and the arm extensions of the second clamping arm are separated by transition links extending substantially perpendicular to the central region and the central body includes guide recesses for receiving the transition links of the second clamping arm for guiding the movement of the second clamping arm with respect to the first clamping arm. Further, the first clamping arm is formed as an integral part of the central body.

These, as well as additional advantages of the present invention, will become apparent from the following detailed description of the invention when read in light of the several figures.

DETAILED DESCRIPTION OF THE PRESENT INVENTION

Figure 3:
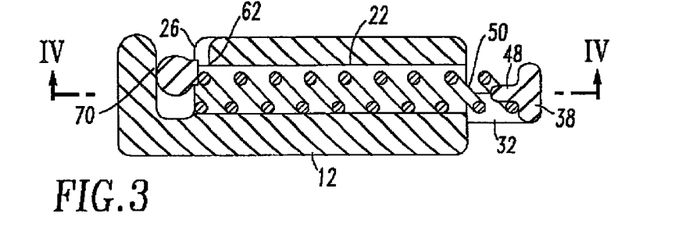
FIG. 3 is a cross-sectional view taken along lines III—III of FIG. 2.
Figure 4:
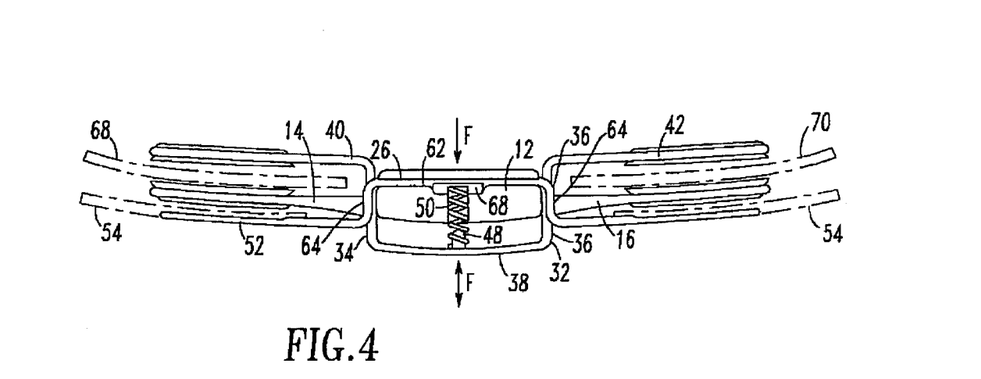
FIG. 4 is a cross-sectional view taken along lines IV—IV of FIG. 3.
Figure 5:
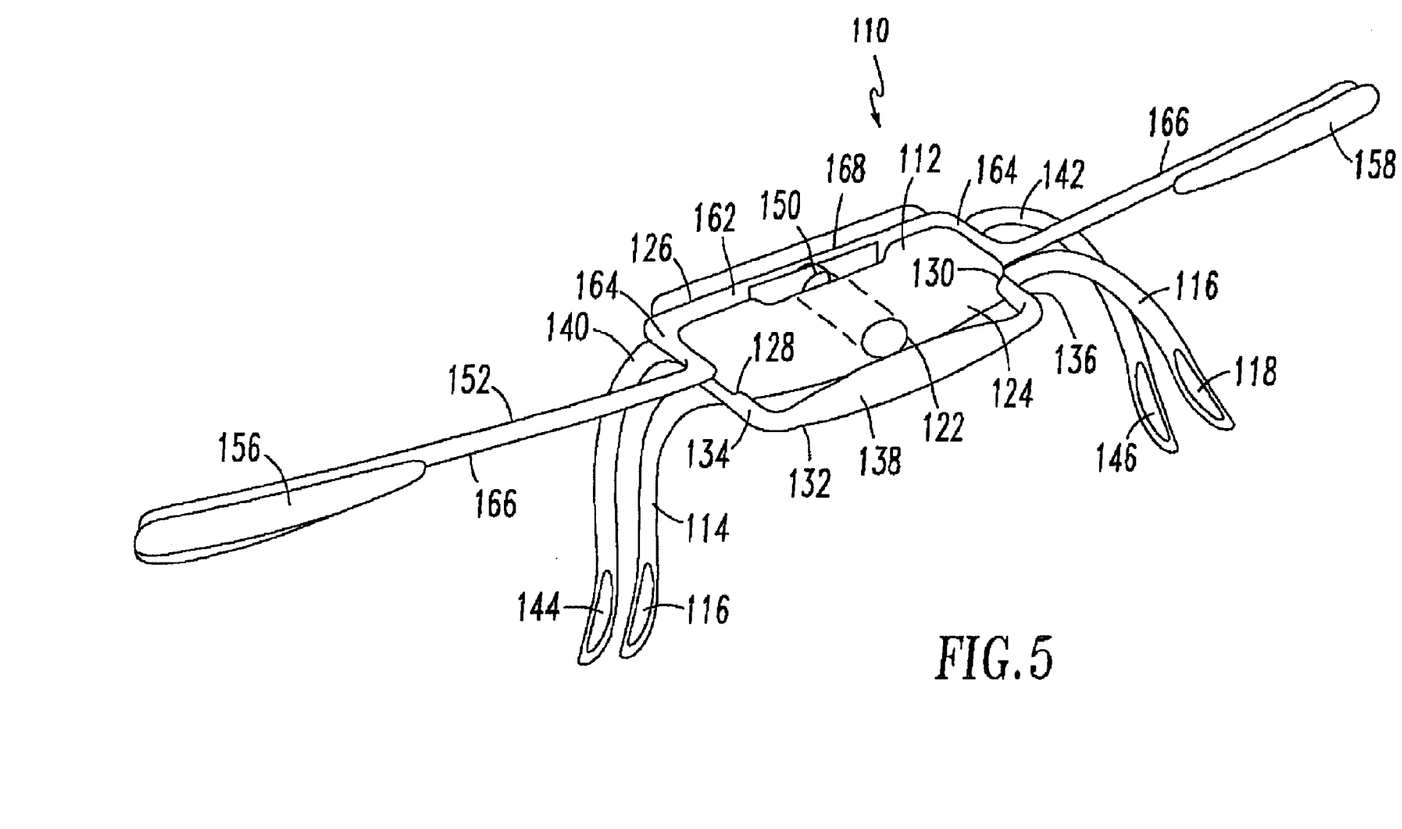
FIG. 5 is a perspective view of a clip-on sunglass assembly in accordance with an alternative embodiment of the present invention.
Figure 6:
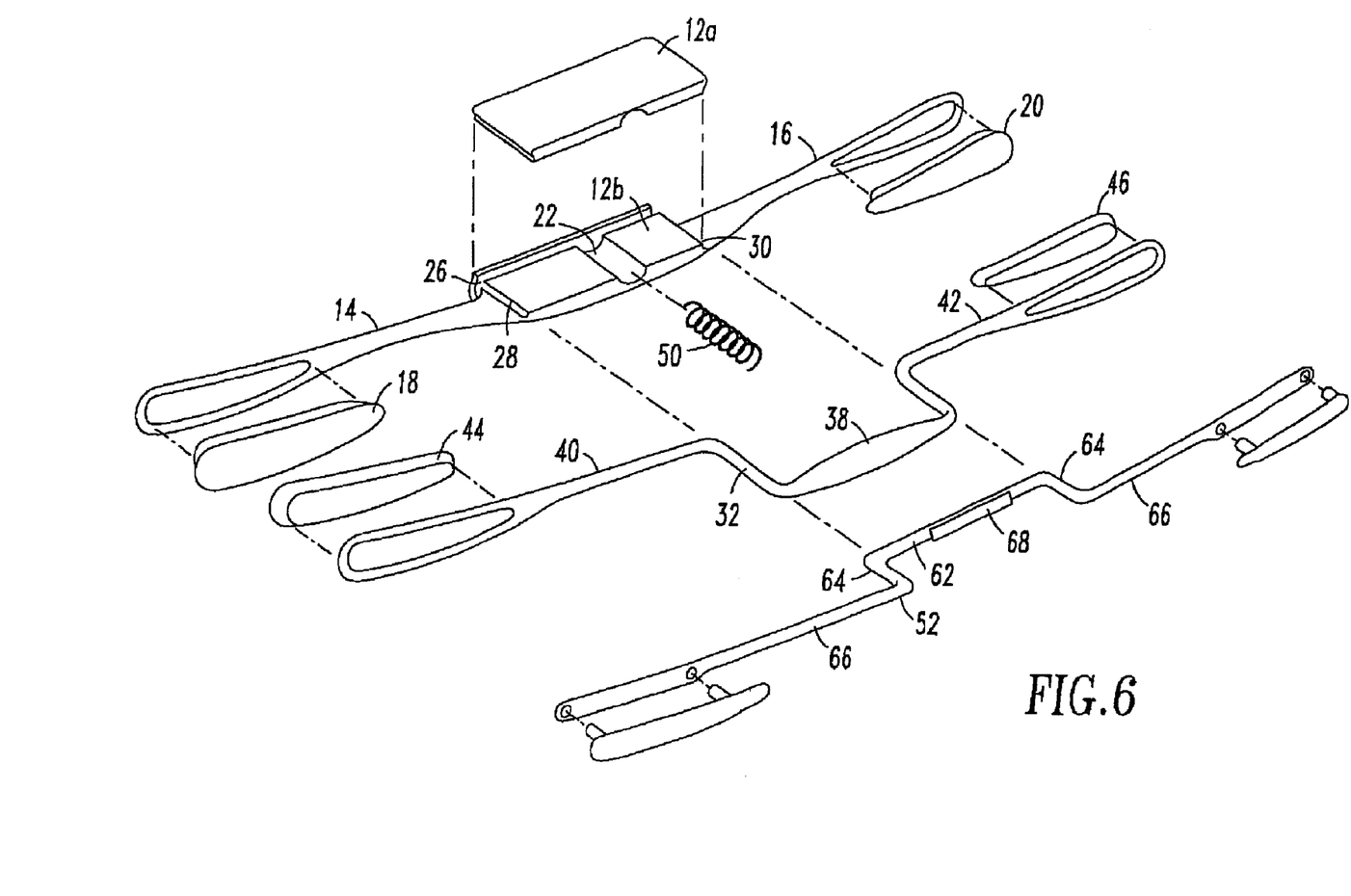
FIG. 6 is a perspective view of a clip-on sunglass assembly in accordance with an alternative embodiment of the present invention.

FIGS. 1–4 illustrate an initial embodiment of the present invention. FIGS. 5 and 6 illustrate alternatives to the embodiment illustrated in FIGS. 1–4 while FIGS. 7–10 illustrate a preferred embodiment of the present invention. Like reference numerals will be utilized throughout the several figures to indicate like elements.

Initially, it is noted that the structure and design illustrated in each of FIGS. 1–10 is set forth merely by way of example. The clip-on sunglass assembly may take on any configuration without departing from the spirit, scope and operation of the present invention.

Figure 1:
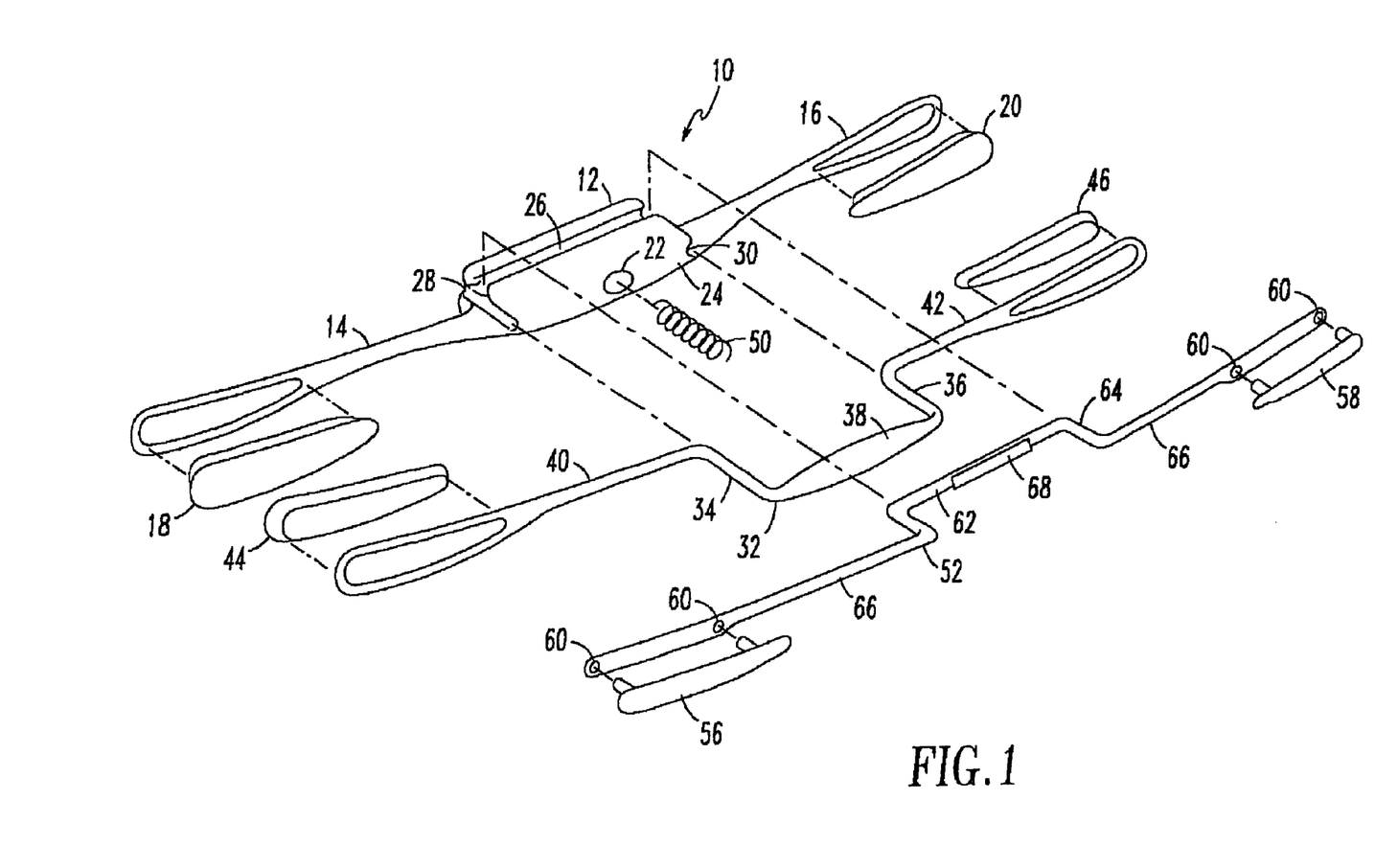
FIG. 1 is an assembly perspective view illustrating the clip-on sunglass assembly in accordance with the present invention in its unassembled state.

With reference now to FIG. 1, the assembly is shown in its unassembled condition illustrating the distinct components which make up the clip-on sunglass assembly in accordance with the present invention. Particularly, the assembly 10 includes a body portion 12 having clamping arms 14 and 16 extending therefrom. Positioned at the outer extent of the clamping arms 14 and 16 are clamping pads 18 and 20, the significance of which will be described in greater detail herein below.

The body 12 of the clamping assembly 10 includes a central bore 22 which extends from a front surface 24 of the body 12 to a longitudinal trough 26. This feature is best illustrated in FIG. 3. Adjacent the body 12 of the assembly are grooves 28 and 30 which extend the entire width of the body 12. The grooves 28 and 30 are arranged so as to receive a gripping element 32 which includes guide rails 34 and 36 which extend substantially perpendicular to a central regional 38 of the gripping element 32 as well as the clamping arms 40 and 42 of the gripping element 32. As with the clamping arms 14 and 16 of the main body 12, the clamping arms 40 and 42 of the gripping element include clamping pads 44 and 46 which cooperate with clamping pads 18 and 20 in order to secure the clip-on sunglass assembly to the spectacles of the consumer. It can be appreciated from FIG. 3 that the central regional 38 of the gripping element 32 includes a centering mechanism 48 which maintains the central regional 38 of the gripping element 32 in alignment a coil spring 50 which is received within the bore 22.

Figure 2:
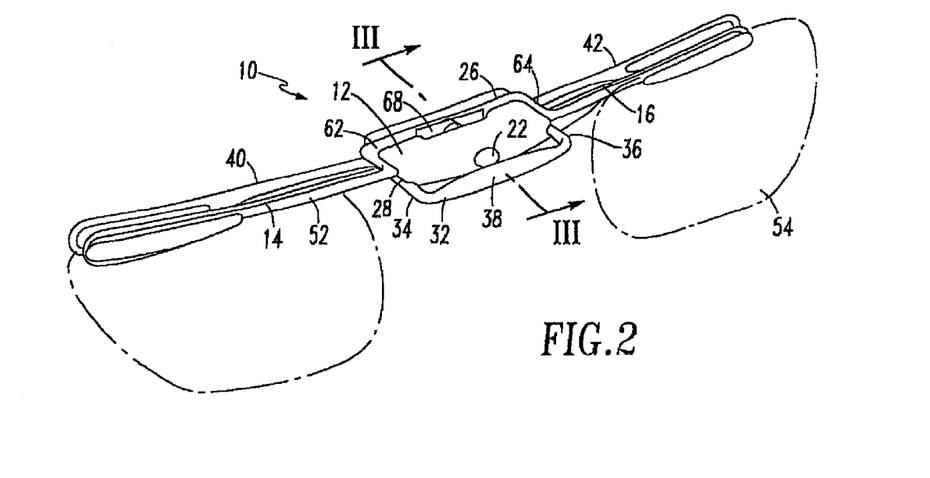
FIG. 2 is a perspective view of the clip-on sunglass assembly in accordance with the present invention.

Received within the trough 26 is a sunglass bar 52 which, as illustrated in FIG. 2, carries the tinted lenses 54. The tinted lenses are positioned adjacent the sunglass bar by clips 56 and 58 which extend through the tinted lenses 54 and into bores 60 of the sunglass bar 52 in a conventional manner. The clips 56 and 58 may be of a decorative nature or may be of a material substantially identical to that of the tinted lenses 54 themselves so as to be concealed. It should be noted that any mechanism for positioning the tinted lenses 54 with respect to the sunglass bar may be utilized without departing from the spirit and scope of the present invention.

A central region of the sunglass bar 54 includes a linear extent 62 which is received within the trough 26 of the body 12. Extending substantially perpendicular from the linear extent are transition legs 64 which connect the linear extent 62 with the lens carrying arms 66 of the sunglass bar 52. Further, along a central regional of the linear extent is provided a planar surface 68 which may be formed in the linear extent 62 or formed adjacent to the linear extent 62 so as to form a planar surface against which the compression spring 50 contacts. Again, the significance of this feature will be explained in greater detail here and below.

Once assembled and as is apparent from FIG. 2, the flip-up sunglass assembly can be readily positioned on a consumer's spectacles. With reference to FIGS. 2 and 4, the clamping arms 40 and 42 of the gripping element 32 are positioned on an opposing side of the clamping arms 14 and 16. The clamping arms 40 and 42 of the gripping element 32 are displacable with respect to the clamping arms 14 and 16 of the body 12 by applying a force in a direction F illustrated in FIG. 4 on both the body 12 and central regional 38 of the gripping element. This is readily accomplished by the thumb and forefinger of a single hand of the user. When a force in the direction F illustrated in FIG. 4 is applied, the spring 50 is compressed and the guide rails 34 and 36 of the gripping element 32 slide within the grooves 28 and 30 formed in the body 12. The grooves 28 and 30 cooperate with the guide rails 34 and 36 in order to maintain alignment of the clamping pads 44 and 46 with the clamping pads 18 and 20 of the body 12. When the force F is released by the consumer, that is when the flip-up sunglass assembly 10 is positioned about a consumer's spectacles, the compression spring 50 expands moving the central regional 38 of the gripping element 32 outwardly away from the body 12 thus moving the clamping arms 40 and 42 of the gripping element 32 toward the clamping arms 14 and 16 of the body 12. Accordingly, when the flip-up sunglass assembly is positioned over the spectacles 70 illustrated in hidden lines in FIG. 4, the clamping pads of the gripping element 32 as well as the clamping pads of the body 12 receive the lenses or frames of the consumer's existing spectacles therebetween and fixedly positions the flip-up sunglass assembly with respect to the consumer's spectacles 70. The flip-up sunglass clip is maintained in this position by way of the force exerted by the spring 50 until such time as the consumer wishes to remove the flip-up sunglass assembly from their spectacles. This is readily achieved by, again, applying a force in the direction F using the thumb and forefinger of the consumer thus displacing the clamping arms 40 and 42 with respect to the clamping arms 14 and 16 thereby permitting the flip-up sunglass assembly to be readily removed from the consumer's spectacles.

As noted hereinabove, the sunglass bar 52 includes the linear extent 62 having a planar surface 68 formed thereon. As can be appreciated from FIGS. 3 and 4, the end of the compression spring exerts a force against the planar surface 68 which maintains the tinted lens 54 of the sunglass bar 52 in an operative position. That is, a position wherein the lenses 54 are positioned substantially parallel the lenses 68 of the consumer's spectacles. At such time when the consumer wishes to remove the lenses 54 from the consumer's line of sight without removing the clip-on flip-up sunglass assembly entirely, the sunglass bar 52 is pivotable along an axis extending through the linear extent 62 of the sunglass bar 52 with the force exerted by the compression spring maintaining the sunglass bar 52 within the trough 26. The trough 26 may also include a detent 70 for receiving a portion of the linear extent 62 of the sunglass bar in order to maintain the sunglass bar within the trough 26 during rotation of the linear extent 62 within the trough 26. When rotated, the compression spring 50 exerts a force on the linear extent 62 of a sunglass bar 52 in order to maintain the sunglass bar 52 and consequently, the lenses 54 in an inoperative position, i.e., a position wherein the lenses 54 are removed from the line of sight of the consumer. When it is once gain desired to have the lenses 54 in the operative position, the consumer merely applies a rotational force to the lenses thus pivoting the sunglass bar 52 about the axis extending through the linear extent 62 thereof which again brings the planar surface 68 into contact with the compression spring 50 which maintains the sunglass bar 52 and thus the lenses 54 in the operative position.

As is apparent from the foregoing description, the present invention sets forth a clip-on sunglass assembly wherein the clamping pads of the assembly assert a direct force against the spectacles of the consumer rather than a pivotal force as is the case with the prior art. Moreover, the clamping of the flip-up sunglass attachment to the consumer's spectacle is carried utilizing a compression spring rather than a torsional spring as is the case with the prior art which may readily wear or be damaged due to misuse of the attachment. The clip-on sunglass assembly set forth hereinabove is readily positioned upon a consumer's spectacles with the use of one hand and more particularly with the use of a thumb and forefinger of a single hand which leaves the other hand of the consumer free. In accordance with the present invention, the clamping force exerted on the consumer spectacle is done so by actually biasing the gripping element 32 outwardly from the body 12 which in turn biases the clamping arms towards one another. This simple construction results in a clamping mechanism which may be manipulated time after time without destroying the capability of the clamping mechanism. It should be noted that while the body 12 illustrated in FIGS. 1–4 is of a unitary construction; however, the body may be of a two-piece construction wherein the body is essentially bisected through the grooves 28 and 30 as well as the bore 22 which allows for ease in assembling the gripping element 32 with respect to the body 12. Further, the trough 26 may include a cover formed in an upper portion of the body 12 which, when assembled, encloses a linear extent 62 of the sunglass bar 52 in order to ensure accurate positioning of the sunglass bar 52 with respect to the body 12 as well as ease in maintaining the linear extent 62 within the trough 26. This feature is best illustrated in FIG. 6. Therein, the body 12 is formed of a two part construction, a top 12a and a bottom 12b. The top 12a includes a portion of the central bore 22 and the guide grooves 28 and 30. As can be seen from FIG. 6, the recess or trough 26 is covered by the top 12a so as to reliably maintain the sunglass bar in place in the trough 26.

With reference now to FIG. 5 of the present invention, an alternative embodiment of the clip-on sunglass assembly will be described in greater detail. Particularly, the assembly 110 includes a body portion 112 having clamping arms 114 and 116 extending therefrom. Positioned at the outer extent of the clamping arms 114 and 116 are clamping pads 118 and 120. The body 112, like the body portion 12 of the clamping assembly 10 includes a central bore 122 which extends from a front surface 124 of the body 112 to a longitudinal trough 126. Adjacent the body 112 of the assembly are grooves 128 and 130 which extend the entire width of the body 112. The grooves 128 and 130 are arranged so as to receive the gripping element 132 which includes guide rails 134 and 136 which extend substantially perpendicular to a central region 138 of the gripping element 132 as well as the clamping arms 140 and 142 of the gripping element 132. As with the clamping arms 114 and 116 of the main body 112, the clamping arms 140 and 142 of the gripping element include clamping pads 144 and 146 which cooperate with clamping pads 118 and 120 in order to secure the clip-on sunglass assembly to the spectacles of the consumer. As with the gripping element 32, the gripping element 132 includes a centering mechanism which maintains the central region 138 of the gripping element 132 in alignment with the coil spring 150 which is received within the bore 122. As with the previous embodiments, the sunglass bar is received within the trough 126. The lenses are positioned adjacent the sunglass bar by clips 156 and 158 which extend through the tinted lenses (not shown) and into the sunglass bar 152 in a conventional manner. As with the previous embodiments, the sunglass bar 152 includes a linear extent 162 which is received within the trough 126 of the body 112. Extending substantially perpendicular from the linear extent are transition legs 164 which connect the linear extent 162 with the lens carrying arms 166 of the sunglass bar 152. Further, along a central regional of the linear extent is provided a planar surface 168 which may be formed in the linear extent 162 or formed adjacent to the linear extent 162 so as to form a planar surface against which the compression being 150 contacts. What renders the embodiment illustrated in FIG. 5 different from that illustrated in FIGS. 1 and 2 is the extent of the clamping arms 114, 116, 140 and 142. In the embodiment illustrated in FIG. 5, the clamping arms extend at an angle with respect to the central body 112 and central region 138. In doing so, the clip-on sunglass assembly will clamp on to an area of the spectacles near the nose bridge rather than the upper portion of the frame or lenses of the spectacles.

With reference now to FIGS. 7–10, a preferred embodiment of the present invention will now be described in detail. The preferred embodiment of the clip-on sunglass assembly in accordance with the present invention includes an assembly 210 having a body portion 212 and clamping arms 214 and 216 extending therefrom. Positioned at an outer extent of the clamping arms 214 and 216 may be clamping pads 218 and 220 respectively. The body 212 includes a central trough 222 which extends from a front surface of the body 212 toward a rear portion thereof. The significance of which will be explained in greater detail hereinbelow.

Extending from an upper surface of the body 212 are supports 223 which support the upper portion or cap 224 which is placed thereon. Formed in the body 212 adjacent the supports 223 are notches 225 which receive clips 227 which extend from an under surface of the cap 224. Again, this feature will be described in greater detail hereinbelow. Further, the upper surface of the body 212 includes grooves 228 and 230 which receive rails 234 and 236 formed in a lower surface of the gripping element 232. Again, this feature will be addressed in greater detail hereinbelow.

Figure 7:
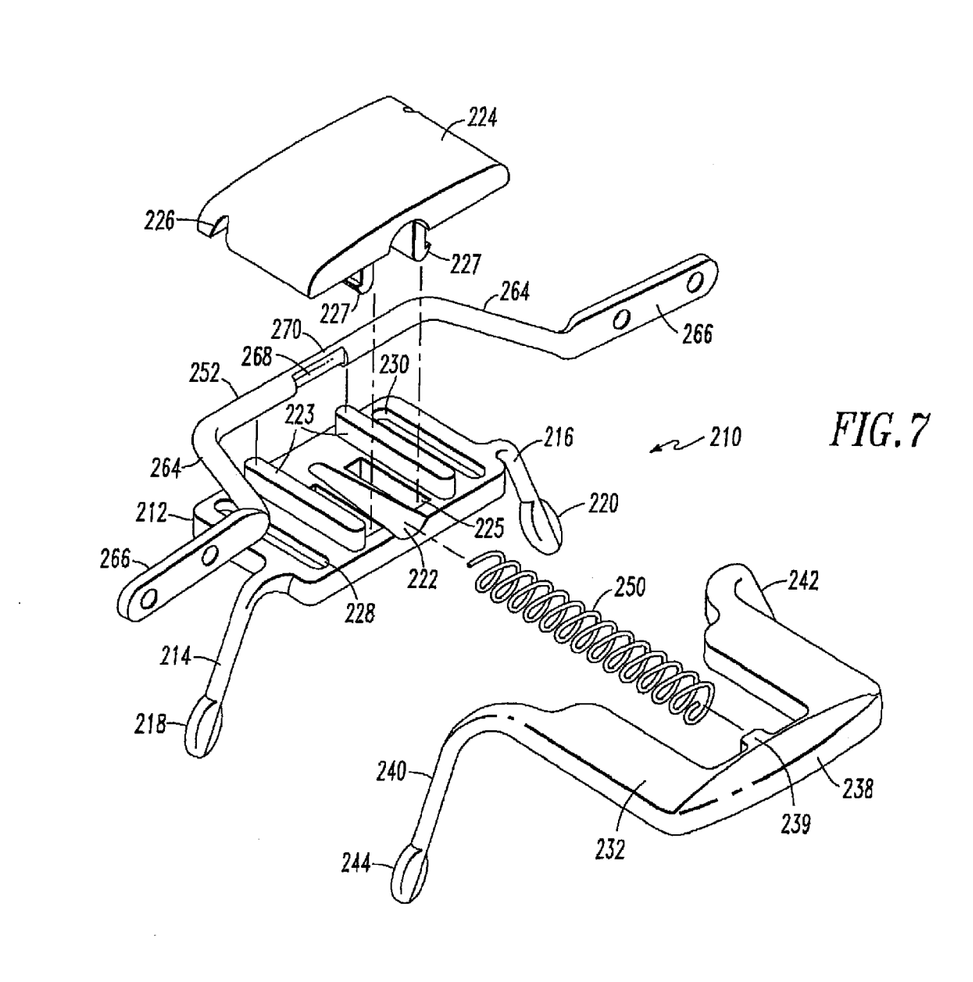
FIG. 7 is perspective view of the clip-on sunglass assembly in accordance with a preferred embodiment of the present invention in its unassembled state.

As with the previous embodiments, the gripping element 232 includes a central region 238 as well as clamping arms 240 and 242 extending therefrom. As with the clamping arms 214 and 216 of the body 212, the clamping arms 240 and 242 may include gripping elements or pads 244 and 246 which cooperate with clamping pads 218 and 220 in order to secure the clip-on sunglass assembly to the spectacles of the consumer. As with the gripping element 132, the gripping element 232 includes a centering mechanism 239 in the form of a peg which maintains the central region 238 of the gripping element 232 in alignment with a coil spring 150 which is received within the recess 222. A sunglass bar 252 is received within a longitudinal trough 226 formed in an under surface of the cap 224. As will be appreciated from FIG. 9, the linear extent 262 of the sunglass bar 252 is supported by supports 223 extending from the body 212. The sunglass bar 252 further includes transitional legs 264 and lens carrying arms 266. With reference to FIG. 7, it can be seen how the components are received relative to one another.

Figure 8:
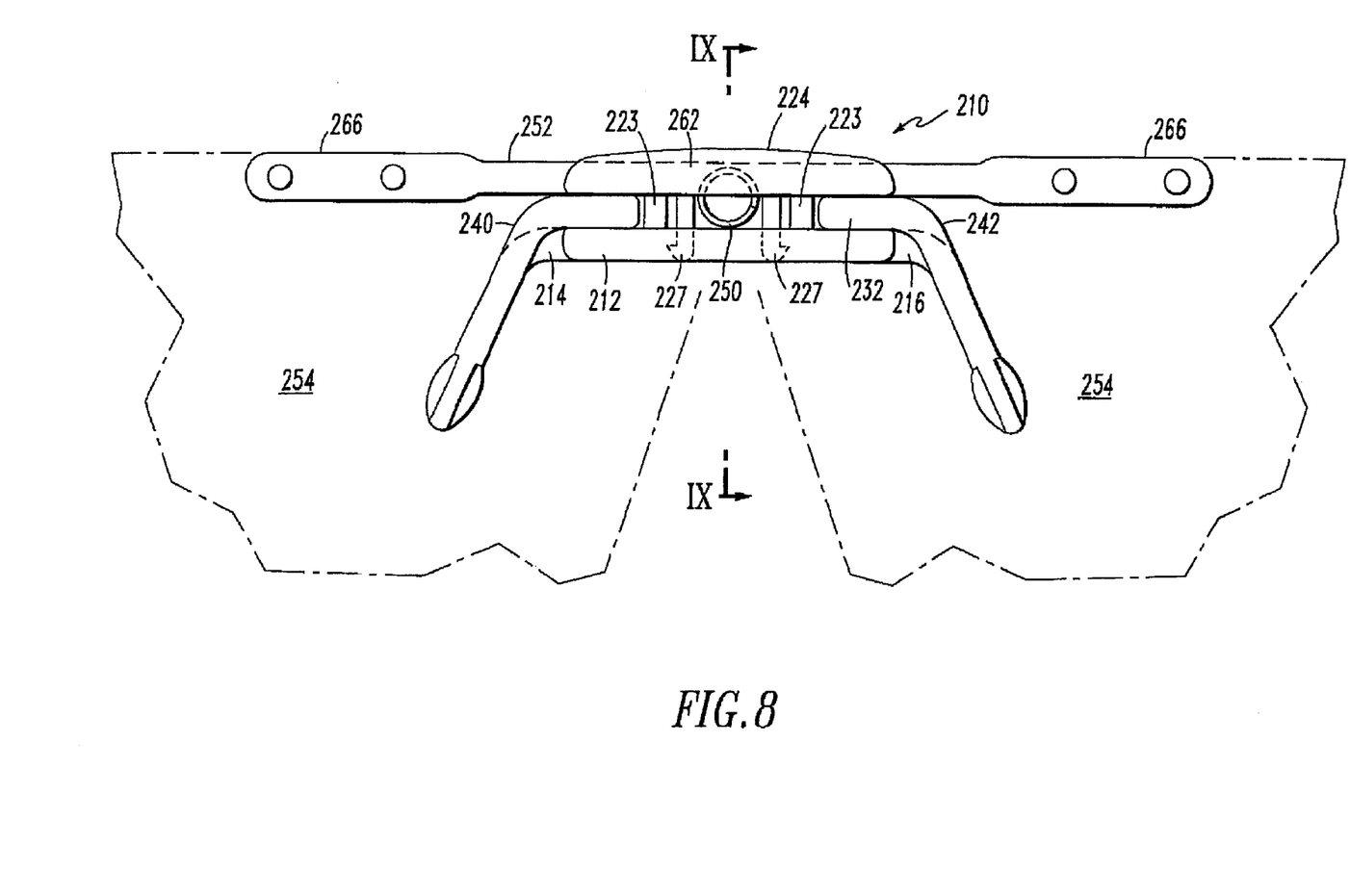
FIG. 8 is a rear elevation view of the clip-on sunglass assembly of FIG. 7.
Figure 9:
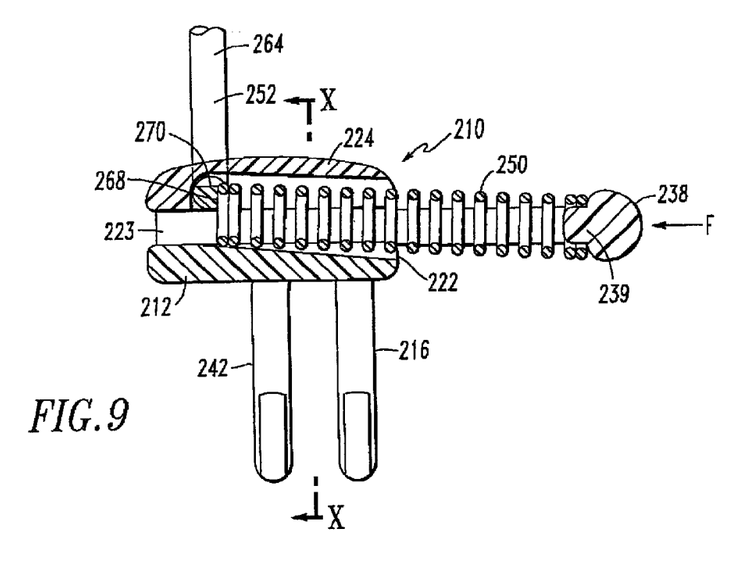
FIG. 9 is a cross-sectional view of the clip-on sunglass assembly taken along linen IX—IX of FIG. 8.
Figure 10:
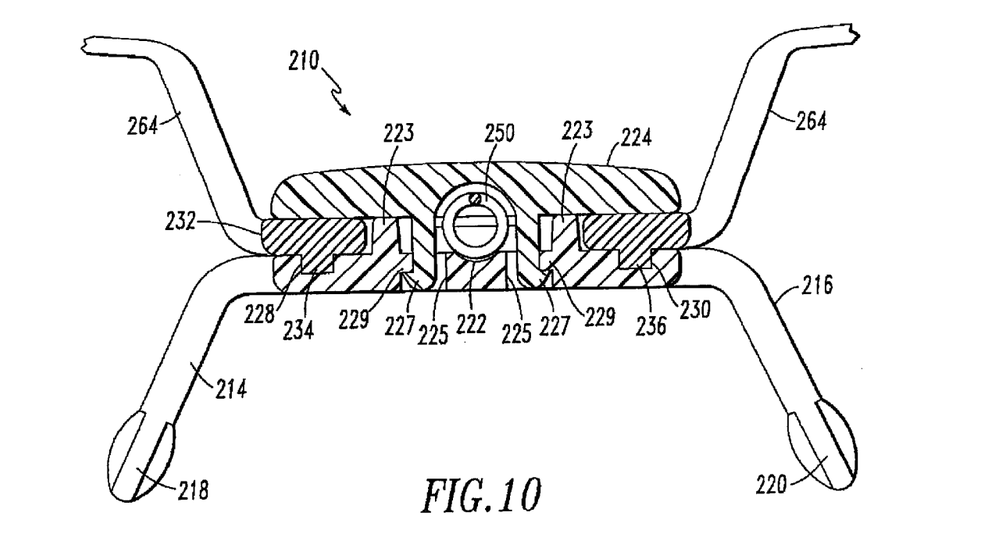
FIG. 10 is a cross-sectional view of the clip-on sunglass assembly taken along line X—X of FIG. 9.

With reference to FIGS. 8–10, the clip-on sunglass assembly is illustrated in its 25 assembled form. Particularly, as can be appreciated from FIG. 10, the clips 227 of the cap 224 are received within notches 225 and are retained in place by detents 229 from the under surface of the cap 224 are such that the cap 224 is supported by supports 223 of the body 212. As can be further seen from FIG. 10, the rails 234 and 236 of the gripping element 232 are readily received within grooves 228 and 230 of the body 212. This allows the gripping element 232 to be displaced with respect to the body 212 in a controlled linear manner. As with the previous embodiments, when the consumer applies a force to the gripping element 233 in a direction F as illustrated in FIG. 9, the clamping arms 240 and 242 are displaced with respect to the clamping arms 214 and 216 respectively. Tension is applied to the gripping element 232 by way of coil spring 250 which is received in the recess 222. Release of the force on the gripping element 232 allows the coil spring 250 to expand and force the clamping arms 240 and 242 towards and against the clamping arms 214 and 216. As can be appreciated, if a pair of spectacles are positioned between the clamping arms, the clamping arms will secure the assembly 210 with respect to the consumer's spectacles.

As can be seen from FIG. 9, the linear extent 162 of the sunglass bar 252 includes a planar surface 268 and planar surface 270. When the sunglass bar 252 is in the horizontal position, that position illustrated in FIG. 8, the planar surface 170 comes in contact with compression spring 250. In order to remove the sunglass lenses 254 from the line-of-sight of the consumer, the sunglass lenses 254 may be pivoted with respect to the assembly 210 as illustrated in FIG. 9. When pivoted, the transition legs 264 of the sunglass bar 252 extend in a vertical direction thus extending the sunglass lens in a horizontal direction up and out of the line-of-sight of the consumer. The sunglass bar 252 is maintained in this position due to a compression force of the coil spring 250 against the planar surface 268 of the linear extent 262 of the sunglass bar 252. As with the previous embodiments, the sunglass lens can be returned to the line-of-sight of the consumer by merely pivoting the sunglass bar 252 about an axis of the linear extent 262.

Accordingly, as can be appreciated from the foregoing description, a clip-on sunglass assembly has been achieved which is readily and reliably manipulated by the consumer using a single hand, one which requires no pre-preparation by the consumer prior to applying the clip-on sunglasses to existing spectacles and one wherein the clip-on sunglasses may be readily positioned on a user spectacle by merely compressing and releasing the attachment. The present invention provides a clip-on sunglass attachment wherein the mechanism for attaching the sunglass attachment to the spectacles clamps the spectacles utilizing direct pressure rather than pivotal clamping-type pressure and one which can withstand misuse by the consumer. Particularly, one which is not readily damaged due to over extension of the clamping mechanism.

While the present invention has been described with reference to several embodiments, it would be appreciated by those skilled in the art that the invention may be practiced otherwise than as specifically described herein without departing from the spirit and scope of the invention. It is therefore, to be understood that the spirit and scope of the invention be limited only by the appending claims.

What is claimed is:

1. A clip-on sunglass assembly for positioning clip-on lenses with respect to spectacles comprising;

a central body;

a first pair of clamping arms extending from said body, said first pair of clamping arms including a central region and arm extensions;

a second pair of clamping arms extending from said body, said second pair of clamping arms including a central region and arm extensions in an opposed position with respect to said first pair of clamping arms;

a lens supporting bar for supporting the lenses mounted on said body; and     a spring for biasing said central regions of said first and second pair of clamping arms in a first direction and said arm extensions of said first and second clamping arms in a second direction for securing the clip-on sun glass assembly with respect to the spectacles.

2. The clip-on sunglass assembly as defined in claim 1, further comprising a recess formed in said body for pivotally receiving at least a portion of said lens supporting bar.

3. The clip-on sunglass assembly as defined in claim 2, wherein said spring contacts said lens supporting bar for maintaining said lenses in one of an operative and inoperative position with respect to the spectacles.

4. The clip-on sunglass assembly as defined in claim 3, wherein said second pair of clamping arms are movable with respect to said body.

5. The clip-on sunglass assembly as defined in claim 4, further comprising a central bore formed in said body and intersecting said recess for receiving said spring.

6. The clip-on sunglass assembly as defined in claim 5, wherein said central region and said arm extensions of said second clamping arm are separated by transition links extending substantially perpendicular to said central region.

7. The clip-on sunglass assembly as defined in claim 6, wherein said body includes guide recesses for receiving said transition links of said second clamping arm for guiding the movement of said second clamping arm with respect to said first clamping arm.

8. The clip-on sunglass assembly as defined in claim 1, wherein said first pair of clamping arms are formed as an integral part of said body.

9. The clip-on sunglass assembly as defined in claim 8, wherein said second pair of clamping arms are movable with respect to said body.

10. The clip-on sunglass assembly as defined in claim 9, wherein said central region of said second clamping arm are includes at least one guide extension extending substantially perpendicular to said central region.

11. The clip-on sunglass assembly as defined in claim 10, wherein said body includes guide recesses for receiving said guide extensions of said control region of said second clamping arm for guiding the movement of said second clamping arm with respect to said first clamping arm.

12. The clip-on sunglass assembly as defined in claim 1, wherein said body includes a recess for receiving a central region of said lens supporting bar.

13. The clip-on sunglass assembly as defined in claim 12, wherein said spring contacts said lens supporting bar for maintaining said lenses in one of an operative and inoperative position with respect to the spectacles.

14. The clip-on sunglass assembly as defined in claim 13, further comprising a central bore formed in said body and intersecting said recess for receiving said spring.

15. The clip-on sunglass assembly as defined in claim 1, wherein said first and second pairs of clamping arms extend at an angle with respect to said body.

16. The clip-on sunglass assembly as defined in claim 15, wherein said spring contacts said lens supporting bar for maintaining said lenses in one of an operative and inoperative position with respect to the spectacles.

17. The clip-on sunglass assembly as defined in claim 16, further comprising a recess formed in said body for receiving said spring.

18. The clip-on sunglass assembly as defined in claim 17, wherein said second pair of clamping arms are movable with respect to said body.

19. The clip-on sunglass assembly as defined in claim 18, further comprising a body cover for overlying said central body and said lens supporting bar.

20. The clip-on sunglass assembly as defined in claim 19, wherein said body includes guide grooves for receiving guide rails of said second clamping arm for guiding the movement of said second clamping arm with respect to said first clamping arm.

21. The clip-on sunglass assembly as defined in claim 20, wherein said first pair of clamping arms are formed as an integral part of said body.

22. The clip-on sunglass assembly as defined in claim 20, comprising notches formed in said body and clips extending from said body cover, wherein at least one of said clips are received in at least one of said notches for securing said body cover with respect to said body.

23. The clip-on sunglass assembly as defined in claim 22, further comprising detents formed in said notches for cooperating with said clips for retaining said clips in said notches.

24. The clip-on sunglass assembly as defined in claim 22, further comprising support rails extending from said body for supporting said body cover.

25. The clip-on sunglass assembly as defined in claim 24, further comprising a recess formed in said body cover for pivotally receiving at least a portion of said lens supporting bar.

26. The clip-on sunglass assembly as defined in claim 25, wherein said lens supporting bar is supported by said supporting rails.

* * * * *